United States Patent [19]

Herrmann et al.

[11] Patent Number: 5,274,367
[45] Date of Patent: Dec. 28, 1993

[54] DEVICE FOR IN-SERVICE MONITORING OF COMMUNICATION TRANSMISSION EQUIPMENT

[75] Inventors: Karl Herrmann, Eckental; Ferdinand Narjes, Munich; Erhard Steiner, Eichenau; Guenter Weimert, Munich, all of Fed. Rep. of Germany

[73] Assignees: U.S. Philips Corporation, New York, N.Y.; Siemens Aktiengesellschaft, Munich, Fed. Rep. of Germany

[21] Appl. No.: 566,389

[22] PCT Filed: Feb. 28, 1989

[86] PCT No.: PCT/DE89/00116
  § 371 Date: Oct. 22, 1990
  § 102(e) Date: Oct. 22, 1990

[87] PCT Pub. No.: WO89/08358
  PCT Pub. Date: Sep. 8, 1989

[30] Foreign Application Priority Data

Mar. 3, 1988 [DE] Fed. Rep. of Germany ....... 3806947
Mar. 3, 1988 [DE] Fed. Rep. of Germany ....... 3806948

[51] Int. Cl.⁵ .............................................. H04Q 1/00
[52] U.S. Cl. .......................... 340/825.08; 340/825.8; 379/200; 370/13.1; 370/112
[58] Field of Search ....................... 340/825.08, 825.07, 340/825.8, 826, 827; 370/13, 13.1, 112; 379/269; 364/200

[56] References Cited

U.S. PATENT DOCUMENTS

| | | | |
|---|---|---|---|
| 3,739,098 | 6/1973 | Camiciottoli et al. | 370/13.1 |
| 4,184,056 | 1/1980 | Basch et al. | 370/13.1 |
| 4,194,090 | 3/1980 | Yabe et al. | 379/269 |
| 4,209,666 | 6/1980 | Lawton | 370/13 |
| 4,417,245 | 11/1983 | Melas et al. | 340/827 |
| 4,546,467 | 10/1985 | Yamamoto | 370/13 |
| 4,558,317 | 12/1985 | Armstrong | 370/13 |
| 4,605,928 | 8/1986 | Georgiou | 340/827 |
| 4,707,829 | 12/1987 | Pendse | 340/825.07 |
| 4,821,267 | 4/1989 | Druegh et al. | 371/22 |
| 4,849,752 | 7/1989 | Bryant | 340/825.07 |
| 5,016,159 | 5/1991 | Maruyama | 364/200 |

FOREIGN PATENT DOCUMENTS 2444558 4/1976 Fed. Rep. of Germany.

OTHER PUBLICATIONS

"Supervision & Additional Services for Digital Fiber-Optic Transmission Systems" by Braun et al, telcom report 10 (1987) Special Multiplexing and Line Transmission pp. 107-112.

Primary Examiner—Donald J. Yusko
Assistant Examiner—Brian Zimmerman
Attorney, Agent, or Firm—Hill, Steadman & Simpson

[57] ABSTRACT

In a device for error locating and/or in-service monitoring for communication transmission equipment comprising a call unit (7, 8) that exchanges information with processor units (6) and wherein the processor units (6) are provided with addresses, a data bus (9, 9A...9H) that connects the telemetry channels of a plurality of transmission links (4; 4a...4g; 4AB...4EG) to one another is provided at at least one location (A...H).

9 Claims, 4 Drawing Sheets

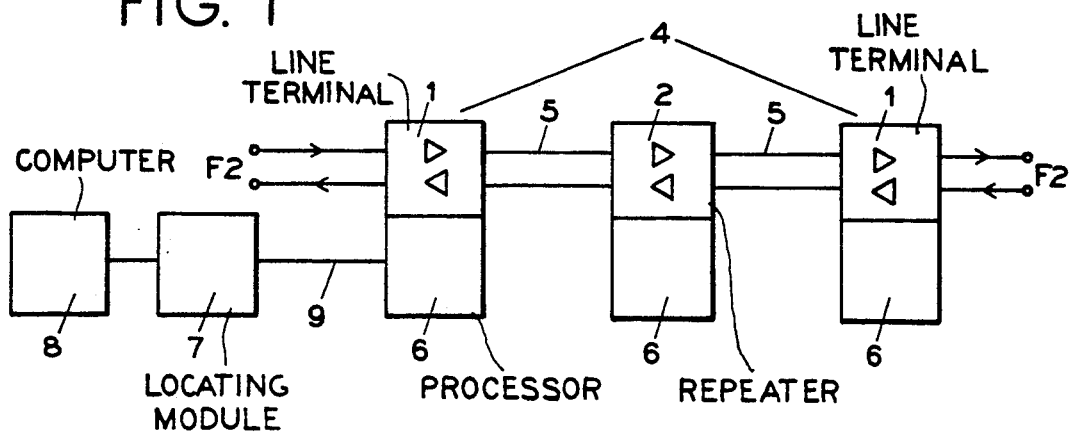
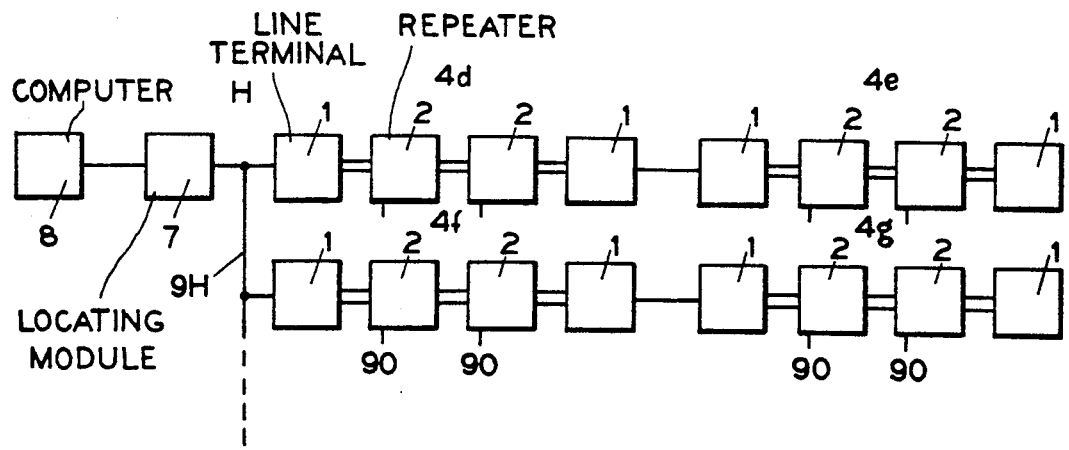

DEVICE FOR IN-SERVICE MONITORING OF COMMUNICATION TRANSMISSION EQUIPMENT

BACKGROUND OF THE INVENTION

The invention is directed to a device for inservice monitoring of communication transmission equipment that contain at least one transmission link having two line terminal equipment between which one or more intermediate locations may be provided. Also provided is a monitoring unit that exchanges information via at least one telemetry channel with processor units that are allocated to monitored local ends and/or intermediate locations.

Such a device is already known from Ewald Braun and Erhard Steiner, "Supervision and Additional Services for Digital Fiber-Optic Transmission Systems" telcom report 10 (1987) Special "Multiplexing and Line Transmission", pages 107 through 112.

In the known device for in-service monitoring of a communication transmission equipment, useful signals are transmitted via an electrooptical transmission link and telemetry signals are transmitted via an auxiliary channel. The device uses address-free telemetry telegrams, so that the processor units provided in the line terminal equipment and intermediate repeaters of a transmission link need not be addressed. The method, however, cannot be employed without further ado in communication transmission equipment that have a star or, respectively, tree structure.

SUMMARY OF THE INVENTION

It is therefore an object of the invention to create a device that allows branched communication transmission equipment to be monitored.

A structure that corresponds to the useful signal network thereby derives for the telegram transmission network of the telemetry means. Processor units that are polled by the monitoring unit in cyclical succession under address control can thus be provided in the telegram transmission network of the appertaining telemetry means in a communication transmission network having star or, respectively, tree structure.

The device for achieving this object has the following elements: the processor units are provided with addresses; and the monitoring unit comprises a means for transmitting polling telegrams that contain addresses to the processor units and comprises a means for receiving a reply telegram of the processor unit that is respectively called; and the communication transmission equipment contains a plurality of processor units at at least one location, these being connected to one another via a data bus that connects the telemetry channels of a plurality of transmission links to one another.

What derives in communication transmission equipment that form a communication transmission network composed of line sections and wherein the line sections each respectively comprise a telemetry channel on the basis of these measures is the advantage that a telemetry network having the desired configuration can be created with the assistance of identical devices.

Advantageous developments of the invention are as follows. The data bus connecting the processor units can be a bidirectional bus for half-duplex operation. The processor unit contains at least one input/output for the connection of a four-wire telemetry channel and contains at least one input/output for the connection of the data bus and contains a switching equipment that, upon receipt of data at the input of one of the input/outputs in a quiescent condition, forwards and received data to the outputs of the other inputs/outputs.

An OR element or an exclusive-OR element precedes the output at each of the inputs/outputs of the processor unit and two inputs of the OR element or, respectively, exclusive-OR element are connected to the inputs of the two other inputs/outputs.

The output at each of the inputs/outputs of the processor unit is connected to a data output of a microprocessor and upon reception of data at the input of one of the inputs/outputs, the microprocessor forwards the received data to the outputs of the other inputs/outputs.

The output at each of the inputs/outputs of the processor unit is connected to a data output of the microprocessor and given reception of data on at least two inputs of the inputs/outputs, the microprocessor dies not forward the received data to the outputs of the other inputs/outputs.

A switch-over means precedes each of the outputs at the processor unit, the switch-over means optionally connecting the switching equipment or a data output of the microprocessor to the appertaining output.

At least those processor units connected to the data bus each respectively contain a transmission-reception unit and the transmission-reception units are controllable by a microprocessor of the respective processor unit such that, in the quiescent condition, all transmitters of the transmission-reception units are high-impedance at their output and output a prescribed logic level when transmitting data.

The transmission-reception unit is controllable by a means for signal edge recognition such that a timer element is started by the signal edge of a start bit of data incoming at one of the telemetry inputs, the timer element activating the transmitter of the transmission-reception unit for the duration of at least two characters and simultaneously inhibiting a receiver of the transmission-reception unit. A further holding and disconnect is assumed by the microprocessor to which the data are simultaneously supplied.

The inputs/outputs can be four-wire terminals or two-wire terminals. In particular, a four-wire terminal is respectively provided for the telemetry signal channel and a four-wire and/or a two-wire terminal is provided for the data bus.

The microprocessor can transmit monitoring data of the appertaining operating location or can optionally transmit data in a protected mode or in a store-and-forward mode, whereby the data transmission ensues via the appertaining switch-over means instead of ensuing via the OR or, respectively, exclusive-OR elements.

BRIEF DESCRIPTION OF THE DRAWINGS

The invention shall be set forth in greater detail with reference to exemplary embodiments shown in the figures.

The figures show devices for in-service monitoring of communication transmission equipment, namely FIG. 1 having a fundamental digital signal line section;

FIG. 3 having a star network containing a plurality of parallel lines;

DESCRIPTION OF THE PREFERRED EMBODIMENT

Figure 2:
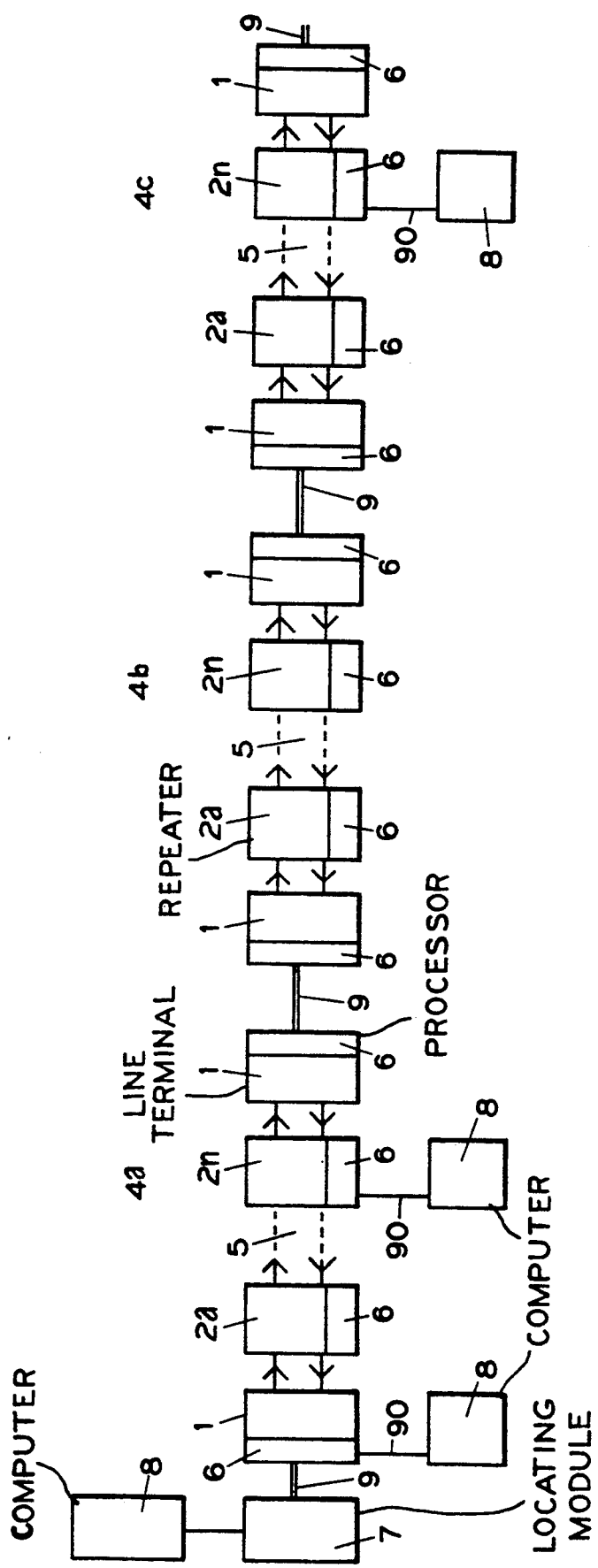
FIG. 2 having a line network composed of three fundamental digital signal line sections.

Line terminal equipment, intermediate repeaters and light waveguides are the basic elements of the digital signal transmission link shown in FIG. 1 whose functionability and transmission properties are monitored with the assistance of devices of a means for in-service monitoring that is composed of the locating module 7, of the personal computer 8 and of the in-service monitoring processor units referred to below as processor units 6.

The locating module can be eliminated when the processor units 6 are executed such that they can be connected either as a master or as a slave. One processor unit 6 must then be connected as master and must assume the jobs of the locating module, and the remaining processor units must be connected as slaves.

The smallest unit of a digital signal transmission link is a fundamental digital signal line section 4, referred to as line section 4 below. In the transmission equipment of FIG. 1, the line section is composed of two line terminal equipment 1 and of one or more intermediate repeaters 2 inserted into the link as needed.

A processor unit 6 that receives monitoring data from the main system to be monitored via an internal bus is inserted into every line terminal equipment 1 and into every intermediate repeater 2.

Figure 4:
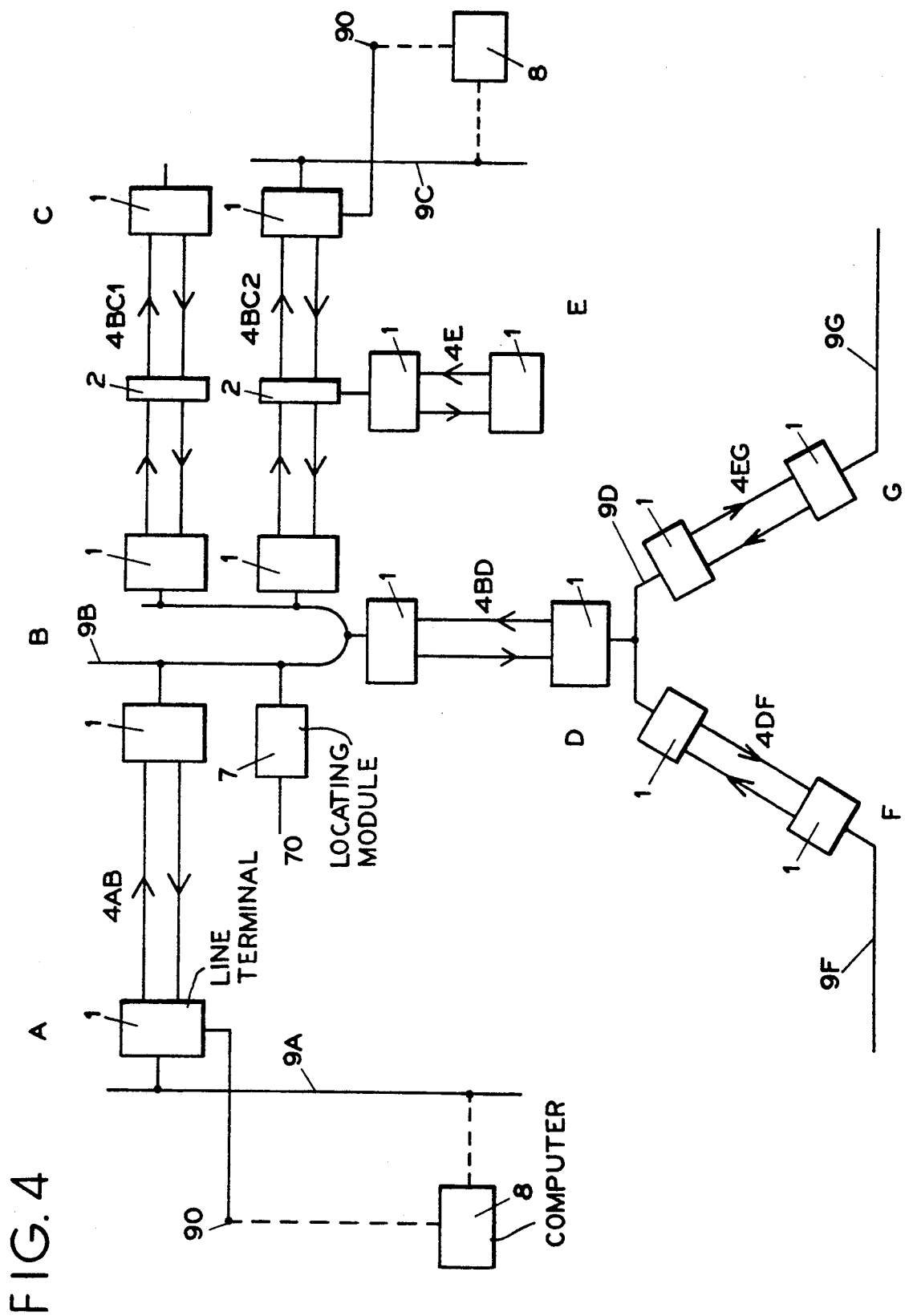
FIG. 4 having a branched star network.

Dependent on the demands, the locating domain can be composed of the following structures:

a line that, according to FIG. 2, is composed of one or more line sections 4 connected in cascade;

according to FIG. 3, a network having parallel lines;

according to FIG. 4, a star network provided with branchings.

Figure 5:
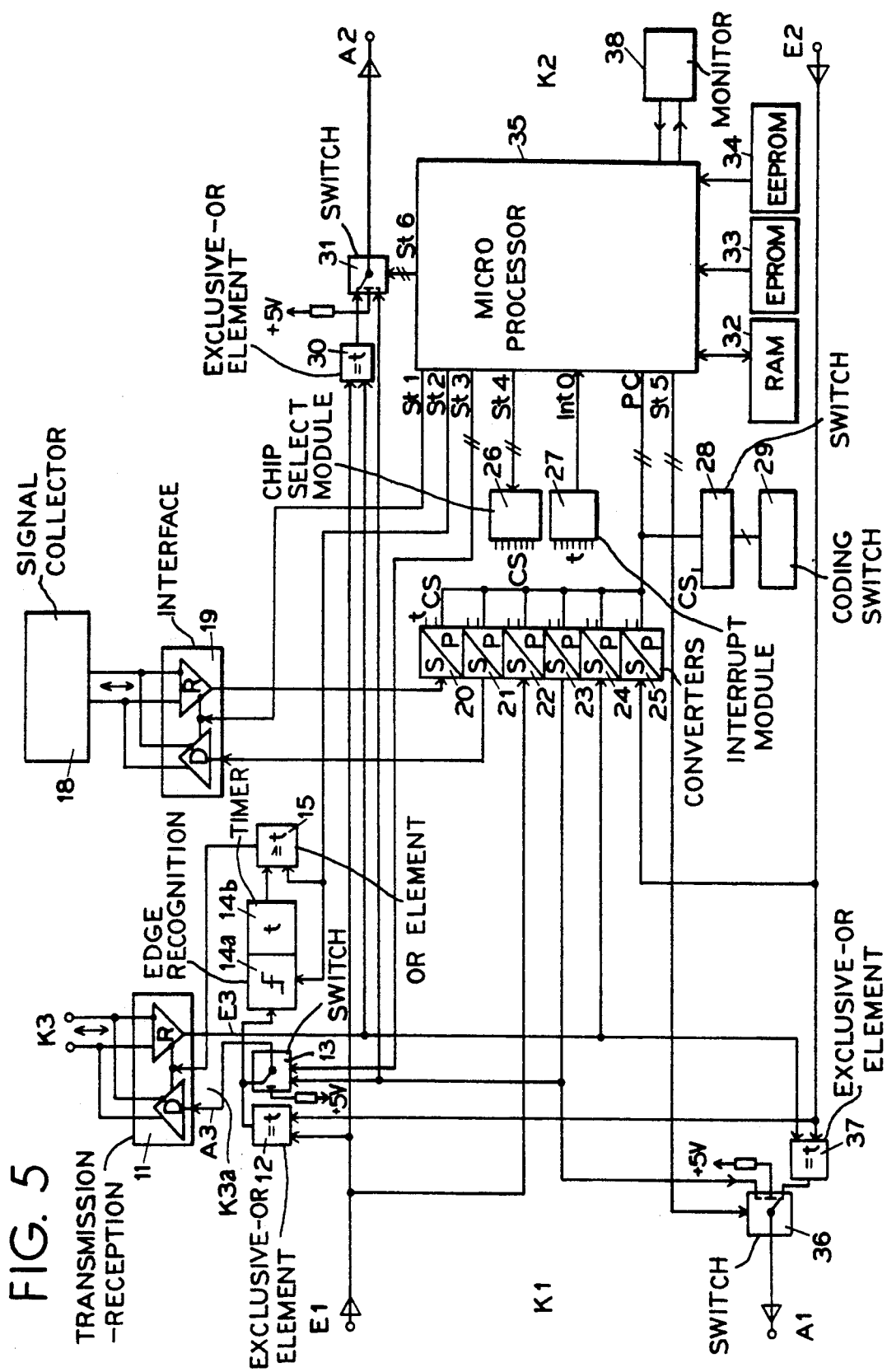
FIG. 5 a processor unit.

Every processor unit 6 is controlled by a microprocessor and is constructed in conformity with FIG. 5. It has a terminal K2 in the line terminal equipment 1 and has two terminals K1 and K2—respectively one for each of the two directions—in the intermediate repeater 2 for infeed and outfeed into and out of the auxiliary channel superimposed on the useful signal. A terminal K3 or, respectively, K3a for a network node is additionally provided.

Dependent upon the application, the terminal K3a having two unidirectional interfaces or the terminal K3 having a bidirectional interface is employed.

The data of the processor units 6 are coupled out within a line section 4 via the terminals K1, K2 and are transmitted in the auxiliary channel that is preferably superimposed on the useful signal.

Within a line, the data of the processor units 6 are transmitted from line terminal equipment 1 to line terminal equipment 1 via the four-wire terminals K1, K2, are coupled into and out of the auxiliary channel and, as warranted, are transmitted from one line section 4a to the next line section 4b via the terminals K3 or, respectively, K3a.

In the arrangement shown in FIG. 2, the line sections 4a...4c are connected in a chain. The locating module is connected to the processor unit 6 of the line terminal equipment 1 in one of the two local ends of the chain circuit. A personal computer 8 is connected to this locating module 7. Further personal computers 8 are connected directly to the processor unit 6 of the first line terminal equipment 1 and to two of the intermediate repeaters 2n.

Useful signals are transmitted from line terminal equipment 1 to line terminal equipment 1 within the line sections 4a...4c. The data of the processor units 6 are transmitted within the line sections 4a...4c via a respective auxiliary channel and are transmitted between the line sections 4a...4c via a respective ISM bus (in-service-monitoring bus) 9 having the interface RS 485 (terminal K3 of the processor unit 6).

In addition, all processor units 6 have a terminal 90, particularly having the interface RS 232 C, to which a personal computer 8 can be connected. This possibility is utilized at one line terminal equipment and at two intermediate repeaters.

FIG. 3 shows two of a plurality of lines that end at the network node N (branch).

The processor units of the line terminal equipment 1 and the locating module 7 are connected to one another at the network node N via the ISM bus 9.

According to FIG. 4, the locations A through G are connected to one another via a branched star network. A line section 4AB without intermediate repeater is provided between the locations A and B; two line sections 4BC1, 4BC2 each having an intermediate repeater 2 are provided between the locations B and C; a line section 4BD is provided between the location B and the location D and a respective line section 4 DF and 4GE is provided between the location D and F and D and G. The location E is also connected to the intermediate repeater 2 of the line section 4BC2 via a line section 4E.

A respective personal computer 8 is connected to the processor unit of the line terminal equipment 1 at the locations A and C. The personal computer 8 can thereby optionally be connected at the ISM bus 9 with the interface RS 485 or at an additional terminal of the processor unit having the interface RS 232 C. In addition to the line terminal equipment 1 of the line sections ending there, the locating module 7 is connected to the ISM bus 9 at the location D, this locating module 7 being provided with a means for polling control. In addition, the locating module 7 has a terminal 70 for connection of a signal collecting means via which the monitoring data of the star network can be polled by the locating module 7 on the basis of the signal collecting means.

At a branch, the data of the processor unit 6 are transmitted between the line terminal equipment 1 via the terminals K3 or, respectively, K4 and via the network node.

In the networks of FIGS. 1 through 4, an equipment for executive sequencing, particularly a locating module 7 and/or a personal computer 8, is connected to one of the network nodes or to one of the processor units. The locating module 7 or a personal computer 8 successively polls the individual processor units 6 via a call-in telegram with their addresses, receives their monitoring data per reply telegram and evaluates these monitoring data.

As may be seen from the figures, a locating domain can be composed of a plurality of fundamental digital signal line sections. The terminal K3 of the processor unit is provided for forwarding the inservice monitoring data from one fundamental digital signal line section to the next fundamental digital signal line section of a line network or to further fundamental digital signal line sections connected to a network node.

This terminal can be composed of two unidirectional interfaces, of a data input and of a data output. In this case, the data of all outputs are expediently conducted into all inputs at the branch locations via intrinsically known four-wire terminations. On the other hand, a connector as disclosed by German Patent 20 48 140 can, for example, be employed for this purpose.

The distribution of the data in the network nodes can be undertaken with lower outlay via a bidirectional bus. In order to avoid data collisions, however, only respectively one driver dare be active at a bus. Given employment of a bidirectional bus, the following sequence is therefore provided for the activation and connection of a bus driver:

All drivers are inactive in the quiescent condition and have a high-impedance output. When data arrive at a terminal K1, K2, a timer that activates the driver for at least two characters is started by the signal edge of the start bit. The continued holding and disconnect is then assumed by the microcomputer to which the data are supplied in parallel. Switching into a mode wherein all data are checked before being passed on and wherein only correct data are forwarded is carried out only when a disturbance in the transmission occurs—recognized by parity or check sum infringement or infringement of a cyclic redundant code (cyclic redundancy check) or non-coincidence of a length byte. This mode can be activated and deactivated by the locating module via a remote control instruction.

The advantage of this method is that the data are quickly through-connected given undisturbed transmission, so that a short query cycle derives and a locating of the error is possible given disturbed transmission in the auxiliary channel.

The processor unit shown in FIG. 5 has an input E1 and output A1 for the connection of a first four-wire data channel for the transmission of telegrams, has an input E2 and output A2 for the connection of a second four-wire data channel and has a third input E3 and output A3 for the connection of a third four-wire data channel.

Via a switch-over means 36, 31 or, respectively, 13 controllable by the microprocessor 35, each of the three outputs A1, A2 and A3 can be optionally connected to the output of an exclusive-OR element 37, 30 or, respectively, 12 or to the output of a parallel-to-serial converter 23. This parallel-to-serial converter 23 has its parallel input connected to the port PO of the microprocessor 35. The switch-over means 36 is thereby controlled via the two-lead control line St5, the switch-over means 13 is controlled via the two-lead control line St3, and the switch-over means 31 is controlled via the two-lead control line St6, being all controlled by the microprocessor 35.

The exclusive OR elements 12, 30 and 37 that each respectively lead to an output of one of the three four-wire terminals and that may be potentially replaced by OR elements operate the data incoming at the inputs of the two other four-wire terminals.

The serial-to-parallel converters 20, 22, 24 and 25 as well as the parallel-to-serial converters 21 and 23 are contained in UART modules or in HDLC modules. The serial-to-parallel or, respectively, parallel-to-serial converters 20 through 25 are connected to the port PO of the microprocessor 35 via an 8-bit parallel bus and are selected by the ,chip select module 26 that is connected to the microprocessor 35. As needed, they interrupt the program of the microprocessor on the basis of the interrupt module 27 that is likewise connected to the microprocessor 35.

The coding switch 29 with whose assistance the processor unit can be set to an address and to the function of an addressing line terminal equipment is also connected to the port PO of the microprocessor 35 via the switch 28.

The RAM 32 serving as data store, the EPROM 33 serving as program memory, the EEPROM 34 serving as non-volatile data memory and the module 38 for self-monitoring are also connected to the microprocessor 35.

The output of the exclusive-OR element 12 is conducted to the one input of the OR element 15 via the means 14a for signal edge recognition and via the means 14b connected in chain therewith. Together with a control input of the means 14a and 14b, the other input of the OR element 15 is connected to the control line St2 coming from the microprocessor 35.

The transmission-reception module 11 lies between the four-wire terminal pair E3, A3 and the bus terminal K3 for the connection of a bidirectional bus. The control input of this transmission and reception module 11 via which the transmitter D or the receiver R can be optionally activated is connected to the output of the OR element 15.

During normal operation, the telegrams are forwarded from the data input E1 or E3 via the exclusive-OR element 30 and the switch 31 directly to the output A2. From the input E2 or E3, the telegrams proceed via the exclusive-OR element 37 and the switch 36 to the output A1.

The exclusive-OR element 12 or, respectively, 30 or, respectively, 37 sees to it that no data are transmitted when data arrives simultaneously at the inputs E1 and E2 or, respectively, E1 and E3 or, respectively, E2 and E3.

Since no data dare arrive simultaneously at the input E1, E2 and E3 given error-free operation, the exclusive-OR elements 12, 37 and 30 inhibit data only in the case of error.

Data that arrive at the input E1 or E2 can also proceed via the exclusive-OR element 12 and via the switch 13 to the transmitter D of the transmission-reception module 11 and can proceed from the latter to the bus terminal K3. To this end, the switch 13 must be situated in the illustrated normal position and the transmitter D must be activated. This is the case when the means 14a recognizes a leading edge and the OR element 15 receives a corresponding control potential via the means 14b and/or via the control line St2.

When, during normal operation, data are conducted via the exclusive-OR element 12 to the bus terminal K3, then these data are also supplied into the means 14a for signal edge recognition. When the means 14a for signal edge recognition recognizes the leading edge of the first bit of a telegram, then it starts the timer circuit 14b. This timer circuit outputs an output pulse that is independent of the bit sequence that arrives at the input of the means 14a for signal edge recognition. The output pulse proceeds via the OR element 15 to the transmission-reception module 11 and immediately activates the driver module D and deactivates the reception module R. Data that arrive at one of the inputs E1 or E2 of the processor unit are thus immediately forwarded to the bus terminal K3 due to the recognition of a leading edge.

The data are simultaneously transmitted to the microprocessor 35 for processing. Data that arrive at the input E1 proceed via the serial-to-parallel converter 22 to the microprocessor 35; data from the input E2 proceed to the microprocessor 35 via the serial-to-parallel converter 25; and data from the input E3 proceed to the microprocessor 35 via the serial-to-parallel converter 24. The serial-to-parallel converters 22, 24 and 25 accept the data byte-by-byte and always output an interrupt pulse to the microprocessor 35 when they have loaded a byte in order to output it to the port PO of the microprocessor 35. When the microprocessor 35 finds that the data satisfy prescribed demands, it activates the control line St2. As a result thereof, the microprocessor 35 activates the driver module D of the interface module 11 via the OR element 15.

When, during the evaluation of a telegram, the microprocessor 35 finds that given demands are not met, then it initiates the processor unit to switch into a store-and-forward mode. In the store-and-forward mode, the microprocessor 35 activates two of the three control lines St3, St5 and St6. Two of the three switches 13, 31, and 36 therefore switch, so that all data that the parallel-to-serial converter 23 outputs proceed to two of the three outputs A1, A2, K3 from whose direction the telegram was not received.

The data incoming at the input E1 are processed in the serial-to-parallel converter 21; the data incoming at the input E2 are processed in the serial-to-parallel converter 25. The microprocessor 35 thus recognizes the direction from which the data come. In store-and-forward mode, the control lines St6 and the control lines St5 are therefore activated such that the output A1 or A2 via which transmission is not carried out is placed at high potential via the switch 31 or 36 and the pull-up resistor.

The signal collector 18 is connected to the microprocessor 35 via the interface module 19 and the serial-to-parallel converter 20 and the parallel-to-serial converter 21. The signal collector 18 supplies the monitoring data of the monitored intermediate location and may receive the control information contained in the call-in telegram for forwarding to a signal collecting means (not shown). The monitoring data of the monitored intermediate location are transmitted in all three directions K1, K2 and K3 by the processor 35 via the parallel-to-serial converter 22, via the switch-over means 13, 31, 36 and via the outputs A1, A2, A3. When, at a network node, a plurality of terminals K3 are connected to one another via a bidirectional bus, then the following sequence derives for the activation and deactivation of a bus driver:

All drivers are inactive in the quiescent condition and have a high-impedance output. When data arrive at the terminal K1 or K2, the timer element 14b is started by the signal edge of the start bit, this timer element 14b activating the driver for at least two characters. The further holding and deactivation is then assumed by the microcomputer 35 to which the data are supplied in parallel.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

I claim:

1. Device for error locating and/or in-service monitoring for communication transmission network that contain at least one transmission link having first and second line terminal equipment between which one or more intermediate locations may be provided, having a monitoring unit that exchanges information via at least one telemetry channel with processor units that are allocated to monitored local ends and/or intermediate locations, the processor units having addresses, and the monitoring unit having a means for transmitting polling telegrams that contain addresses to the processor units and having a means for receiving a reply telegram from a processor unit that has been respectively called, comprising: at at least one location in the communication transmission network a plurality of processor units connected to one another via a data bus that connects the telemetry channels of a plurality of transmission links to one another, each processor unit of the plurality of processor units being allocated to a local end of a respective transmission link of the plurality of transmission links.

2. Device according to claim 1, wherein the data bus connecting the processor units is a bidirectional bus for half-duplex operation.

3. Device according to claim 1, wherein at least each processor unit of the plurality of processor units contains at least two input/output channel ports for the connection of a four-wire telemetry channel and contains at least one input/output node port for the connection of the data bus and contains a switching equipment that, upon receipt of data at an input of one of the at least two input/output channel ports and input/output node port a quiescent condition, forwards the received data to outputs of the others of the at least two input/output channel ports and at least one input/output node port.

4. Device according to claim 3, wherein one of an OR element or an exclusive-OR element precedes the output at each of the at least two input/output channel ports and at least one input/output node port of the processor unit; and wherein two inputs of the OR element or, respectively, exclusive-OR element are connected to the inputs of the two other of the at least two input/output channel ports and at least one input/output node port.

5. Device according to claim 3, wherein the output at each of the at least two input/output channel ports and at least one input/output node port of each processor unit of the plurality of processor units is connected to a data output of a microprocessor; and wherein, upon reception of data at the input of one of the at least two input/output channel ports and at least one input/output node port, the microprocessor forwards the received data to the outputs of the other of the at least two input/output channel ports and at least one input/output node port.

6. Device according to claim 3, wherein the output at each of the of each processor unit of the plurality of processor units is connected to a data output of a microprocessor; and wherein, given reception of data at at least two inputs of the at least two input/output channel ports and at least one input/output node port, the microprocessor does not forward the received data to the outputs of the other of the at least two input/output channel ports and at least one input/output node port.

7. Device according to claim 3, wherein a switch-over means precedes each of the outputs of each processor unit, said switch-over means optionally connecting the switching equipment or a data output of a microprocessor to the appertaining output.

8. Device according to claim 1, wherein at least those processor units connected to the data bus each respectively contain a transmission-reception unit; and wherein the transmission-reception units are controllable by a microprocessor of the respective processor unit such that, in the quiescent condition, all transmitters of the transmission-reception units have a high-impedance at their output and output a prescribed logic level when transmitting data, receivers of the transmission-reception units being inhibited when the transmitters are transmitting data.

9. Device according to claim 8, wherein the transmission-reception unit is controllable by a mans for signal edge recognition such that a timer element is started by the signal edge of a start bit of data incoming at one of the inputs of the at least two input/output channel ports, said timer element activating a transmitter of the transmission-reception unit for the duration of at least two characters of the data and simultaneously inhibiting a receiver of the transmission-reception unit; and wherein further control of the transmitter and receiver is assumed by the microprocessor to which the data are simultaneously supplied.

* * * * *